(12) United States Patent  
Harben

(10) Patent No.: US 7,740,527 B1  
(45) Date of Patent: Jun. 22, 2010

(54) POULTRY STUNNER

(76) Inventor: Grover Harben, 1060 Davis St., Gainesville, GA (US) 30501

( * ) Notice: Subject to any disclaimer, the term of this patent is extended or adjusted under 35 U.S.C. 154(b) by 0 days.

(21) Appl. No.: 12/429,567

(22) Filed: Apr. 24, 2009

(51) Int. Cl.
*A22B 3/06* (2006.01)

(52) U.S. Cl. ........................................ 452/58

(58) Field of Classification Search .................. 452/52, 452/57, 58
See application file for complete search history.

(56) References Cited

U.S. PATENT DOCUMENTS

| | | | |
|---|---|---|---|
| 3,702,017 A | 11/1972 | Lewis | |
| 3,828,397 A | 8/1974 | Harben, Jr. | |
| 4,092,761 A | 6/1978 | McWhirter | |
| 4,675,947 A | 6/1987 | Clatfelter et al. | |
| 4,694,535 A | 9/1987 | Simmons | |
| 4,751,767 A | 6/1988 | Walther | |
| 4,849,237 A | 7/1989 | Hurst | |
| 5,397,263 A | 3/1995 | Schumann et al. | |
| 5,401,209 A | 3/1995 | Ripol et al. | |
| 5,484,332 A * | 1/1996 | Leech et al. | 452/173 |
| 5,888,132 A | 3/1999 | Burnett | |
| 5,938,519 A * | 8/1999 | Wright | 452/173 |
| 6,019,674 A | 2/2000 | Austin | |
| 6,338,673 B2 * | 1/2002 | Berry et al. | 452/58 |
| 6,514,556 B2 | 2/2003 | Hilgren et al. | |
| 6,986,910 B2 | 1/2006 | Howarth | |
| 7,316,824 B2 | 1/2008 | Hilgren et al. | |
| 7,448,943 B1 | 11/2008 | Woodford et al. | |
| 7,588,486 B2 * | 9/2009 | Horst et al. | 452/58 |
| 2001/0044272 A1 | 11/2001 | Berry et al. | |
| 2007/0026114 A1 | 2/2007 | van den Nieuwelaar et al. | |
| 2007/0141973 A1 | 6/2007 | Howarth | |
| 2008/0199562 A1 | 8/2008 | Hilgren et al. | |

FOREIGN PATENT DOCUMENTS

| | | |
|---|---|---|
| WO | WO 9603049 | 2/1996 |
| WO | WO 0105255 | 1/2001 |
| WO | WO 03007721 | 1/2003 |

\* cited by examiner

*Primary Examiner*—Thomas Price  
(74) *Attorney, Agent, or Firm*—Ballard Spahr LLP

(57) ABSTRACT

A system and method for stunning live poultry is presented. In one aspect, the system presented has a poultry stunner defining a partially enclosed passageway and at least one first conduit in fluid communication with the fluid source, configured to direct a first stream of fluid into at least a portion of the at least partially enclosed passageway. In one aspect, the system also can have at least one second conduit in fluid communication with the fluid source, configured to direct a second stream of fluid into at least a portion of the at least partially enclosed passageway. In one aspect, the system comprises an electrical power source coupled to at least one of the first conduit(s) and/or at least one of the second conduit (s). Thus, an electric circuit is formed between the first and second streams of fluid via any of the live poultry that come into contact with the first and second streams of fluid.

29 Claims, 6 Drawing Sheets

POULTRY STUNNER

FIELD OF THE INVENTION

Systems and methods for stunning poultry are presented. More particularly, systems and methods for stunning poultry in a poultry processing plant are presented.

BACKGROUND OF THE INVENTION

Poultry processing plants have become automated to a large extent. Due to Federal regulations, it is necessary to kill the birds while they are in an inverted configuration, so that the blood is pumped from the birds' body via their own heart. Typically, birds are processed in an inverted position with their hocks suspended by shackles pivotally mounted to an overhead conveyor line. This orientation places the tail region roughly midway down the bird body while the pivotal mounting enables the birds to be manipulated along the process line. It is common practice to electrically stun the birds prior to processing them while they are inverted and shackled. In this manner, the birds, while alive, remain relatively motionless for processing.

Conventionally, stunning the birds is achieved by positioning the conveyor system to move shackled birds through an electrolytic solution charged with an electric current. Loading the birds into the shackles is conventionally done by hand and, since the birds are alive, it can be a cumbersome task. Therefore, there is a need in the industry for a system or apparatus to facilitate easier loading of the birds.

SUMMARY

A system for stunning live poultry is presented. In one aspect, the system presented comprises a poultry stunner defining an at least partially enclosed passageway. The birds can be fed into the passageway by conventional means. In another aspect, the system comprises at least one first conduit in fluid communication with the fluid source, configured to direct a first stream of fluid into at least a portion of the at least partially enclosed passageway. In one aspect, the system also comprises at least one second conduit in fluid communication with the fluid source that is configured to direct a second stream of fluid into at least a portion of the at least partially enclosed passageway.

In one aspect, the system comprises an electrical power source coupled to at least one of the first conduit(s) and/or at least one of the second conduit(s). In one aspect, the electrical power source can supply direct current (DC); however, in another aspect, the electrical power source can supply alternating current (AC). In one aspect, a first terminal of the power source is coupled to at least one of the first conduits. In this aspect, the fluid passing through the at least one conduit becomes electrically charged. Therefore, as one skilled in the art will appreciate, the stream of fluid that is directed into the passageway is also electrically charged.

In one exemplary aspect, the conveyor comprises a non-conductive material. In yet another aspect of the poultry processing system, the fluid source in communication with the conduits comprises a saline electrolyte. Optionally, in one aspect, the fluid is heated to a temperature in a range from about 80 degrees Fahrenheit and about 140 degrees Fahrenheit.

The system described herein also presents a method of stunning live poultry for processing. In one aspect, the method comprises one or more of the steps of: providing the poultry stunner; conveying the live poultry through the at least partially enclosed passageway; providing a fluid source; directing a first stream of fluid from the fluid source into at least a portion of the enclosed passageway; directing a second stream of fluid from the fluid source into at least a portion of the enclosed passageway; providing an electrical power source, energizing the first stream of fluid with an electric current; and energizing the second stream with an opposite charge than that of the first fluid stream.

DETAILED DESCRIPTION OF THE FIGURES

These and other features of the preferred embodiments of the invention will become more apparent in the detailed description in which reference is made to the appended drawings wherein.

DETAILED DESCRIPTION OF THE INVENTION

Figure 1:
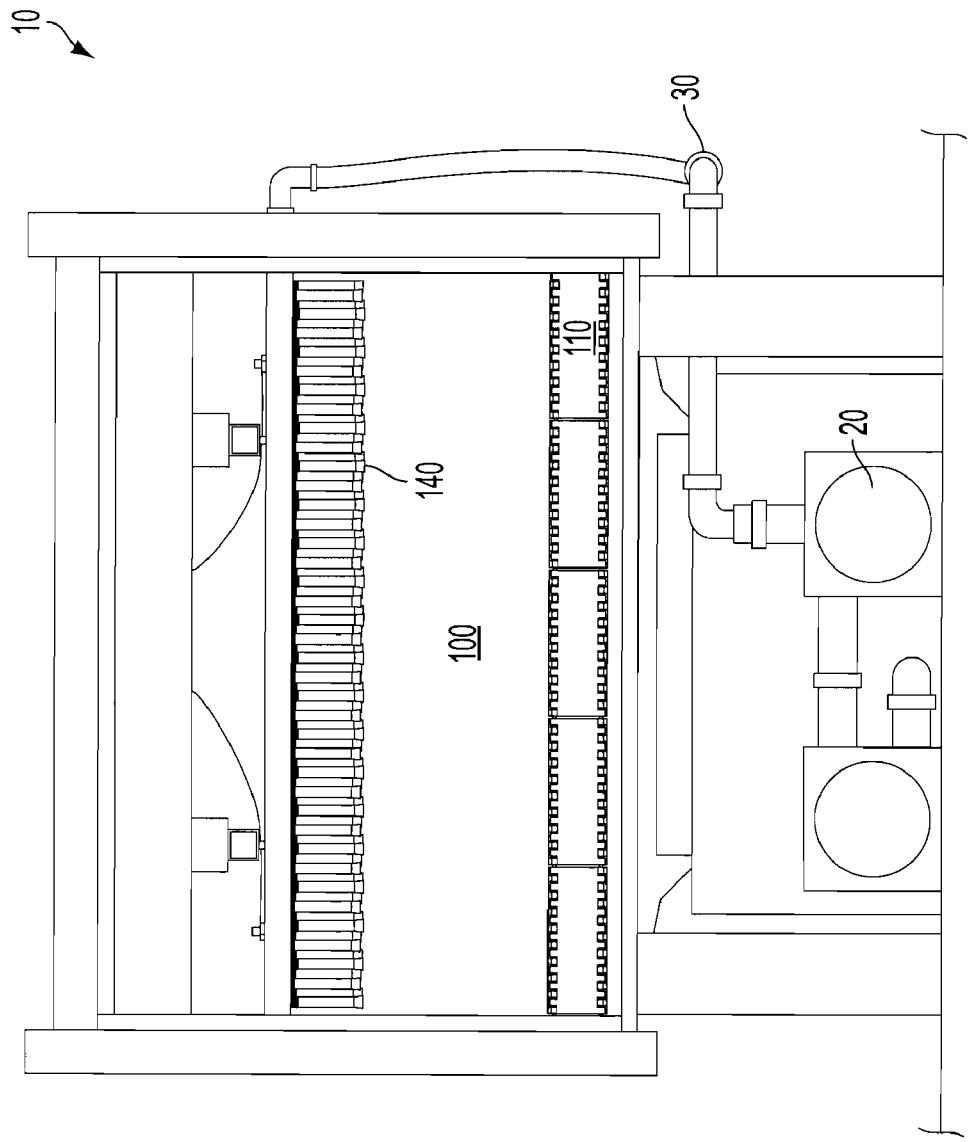
FIG. 1 is a front elevational view of one aspect for a poultry stunner.
Figure 2:
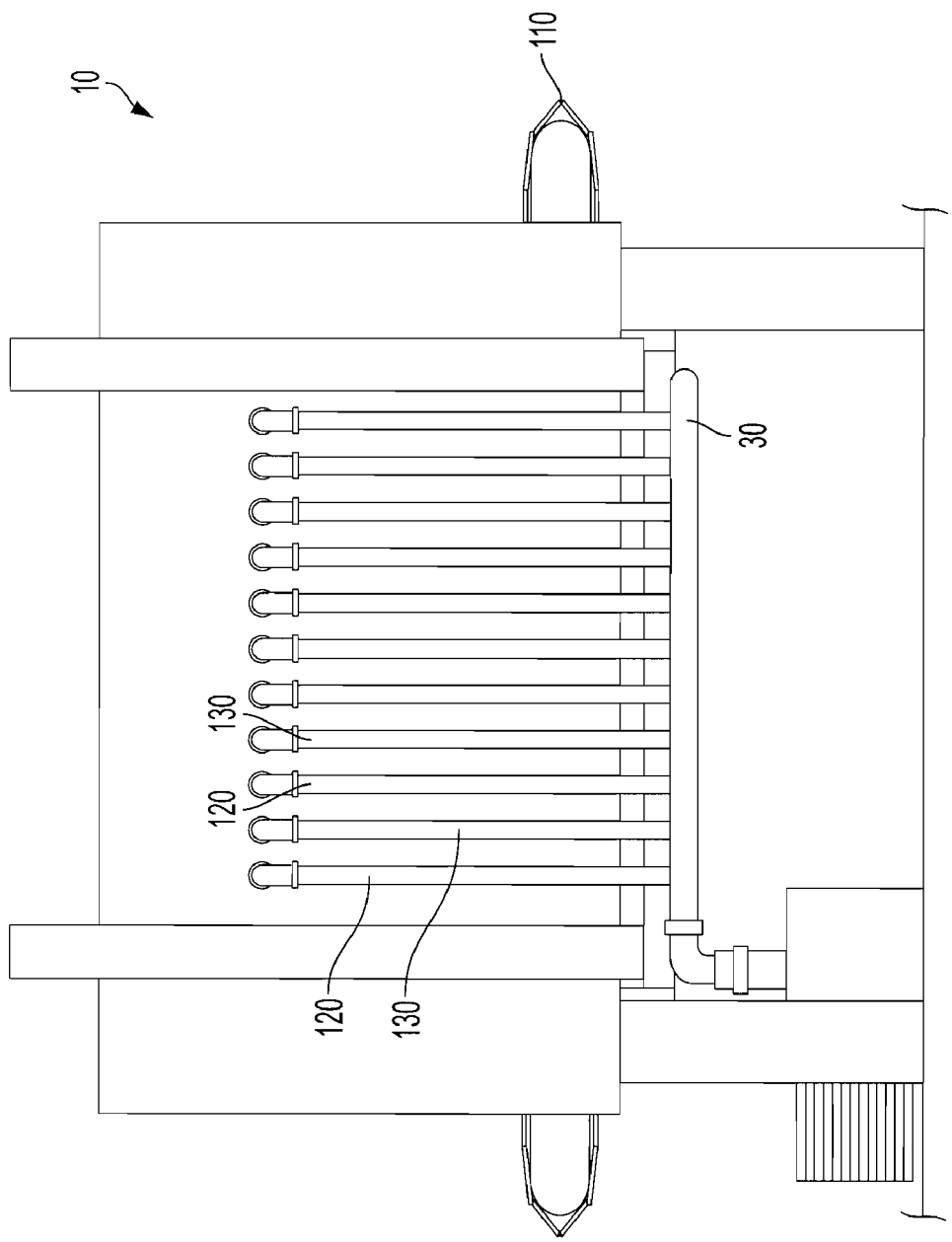
FIG. 2 is a side elevational view of the poultry stunner of FIG. 1, illustrating a fluid source.
Figure 3:
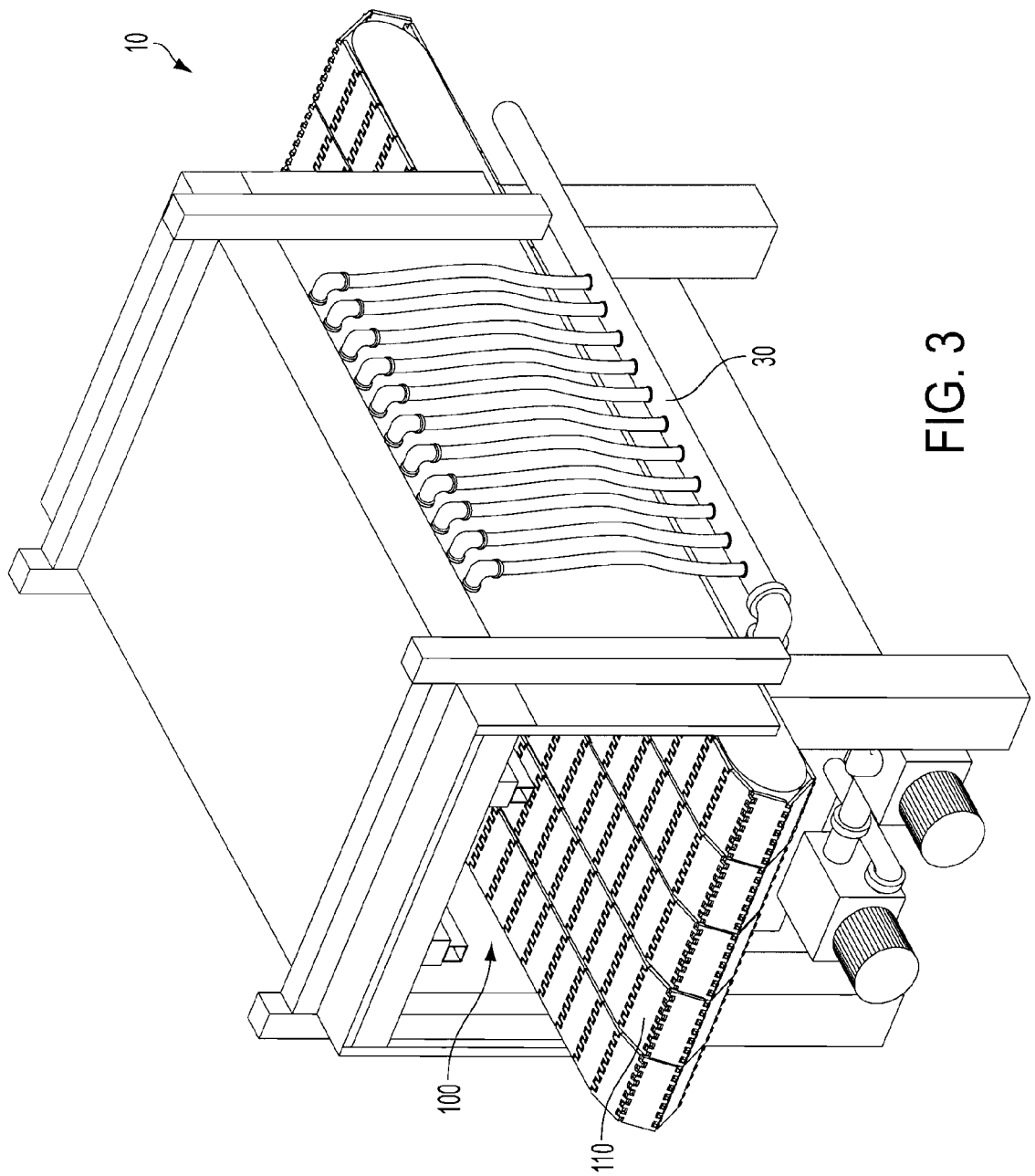
FIG. 3 is a perspective view of the poultry stunner of FIG. 1.

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a shackle" can include two or more such shackles unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

A system for stunning live poultry is presented herein. As mentioned above, in the poultry processing industry, birds are generally stunned to keep them relatively motionless, yet still alive, during processing. Prior art systems typically stun the birds while they are in shackles hanging in an inverted orientation. In one aspect, the system presented comprises a poultry stunner 10 that defines a partially enclosed passageway 100. It is contemplated that the birds can be fed into the passageway 100 by conventional means. For example and without limitation, the birds can be loaded from the delivery trucks into a hopper or other storage device. The hopper can, for example, feed or otherwise urge the birds to a conveyor system 110, which can move the birds through the passageway. Optionally, it is contemplated that the birds can be fed directly to a conveying device without the need for a hopper.

Figure 4:
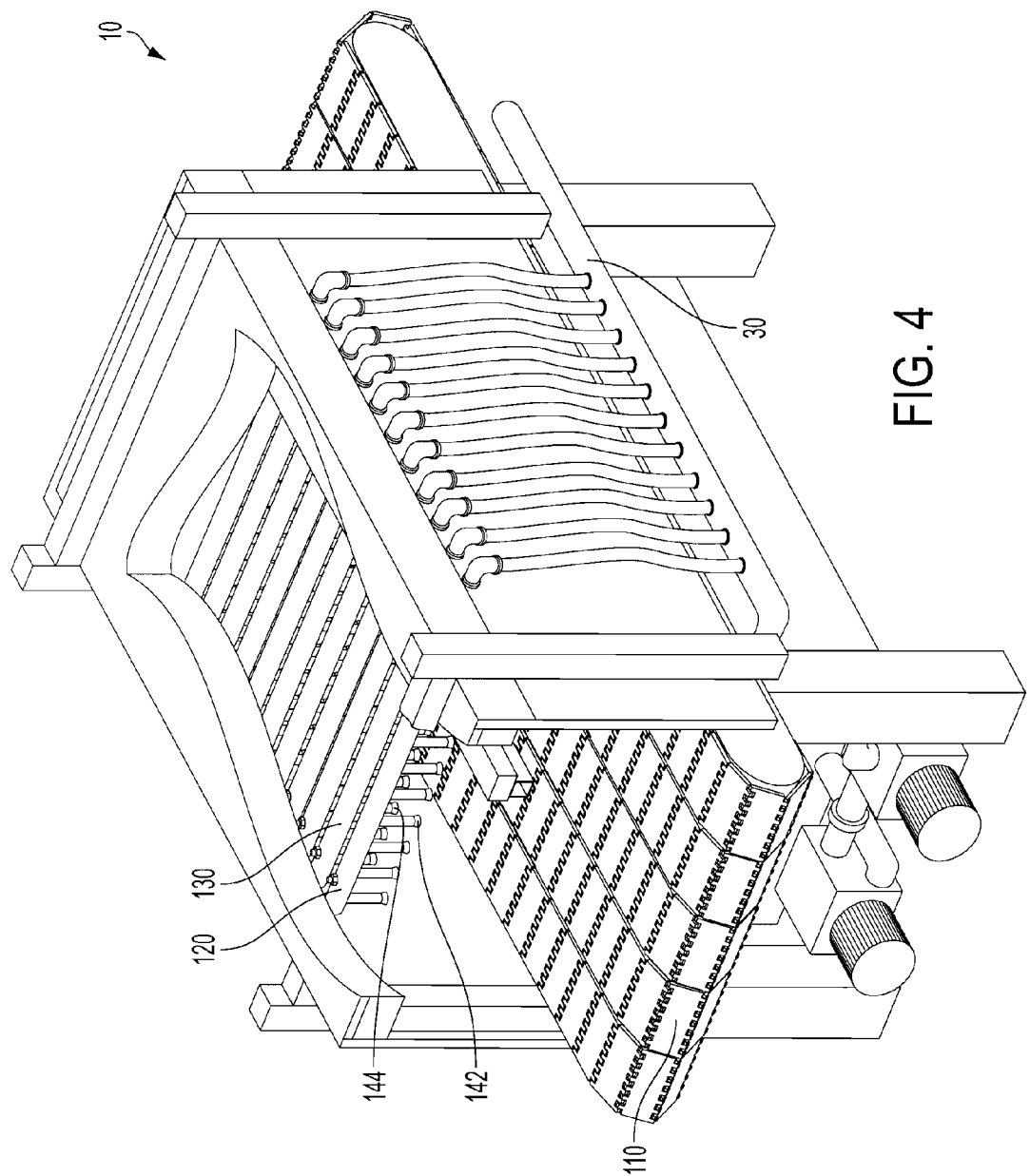
FIG. 4 is a partially transparent perspective view of the poultry stunner of FIG. 1, illustrating a plurality of first and second conduits.

In another aspect, the system comprises at least one first conduit 120 in fluid communication with a fluid source 20 that is configured to direct a first stream of fluid into at least a portion of the at least partially enclosed passageway. As illustrated in FIG. 4, and as can be appreciated, there can be a plurality of first conduits 120 in fluid communication with the fluid source 20 that are configured to direct a first stream of fluid into at least a portion of the at least partially enclosed passageway. As can be appreciated, the first conduits can be connected directly to the fluid source, or they can be connected to several distinct fluid sources. It is also contemplated that the fluid source can be connected to a manifold 30, which feeds the plurality of first conduits.

In one aspect, the system also comprises at least one second conduit 130 in fluid communication with the fluid source that is configured to direct a second stream of fluid into at least a portion of the at least partially enclosed passageway. As with the first conduit(s), the second conduit(s) can each be connected directly to the fluid source, connected to several distinct fluid sources, or connected to a manifold 30, which in turn is connected to the fluid source. Additionally, it is contemplated that the second conduit(s) can be connected to the same fluid source as the first conduit(s), or they can be connected to a different fluid source.

In one exemplary aspect, the first and second conduits can be positioned on opposing sides of the passageway 100. In this aspect, the stream from the first conduit(s) 120 and the second conduits 130 can be substantially directed toward the longitudinal axis of the passageway. In another aspect, the first and second conduits can be positioned over a top portion of the passageway, directing the first and second streams substantially downward into the passageway. In this aspect, where the first and second conduits each comprise a plurality of conduits, at least some of each of the first and second conduits can be interdigitated. In still another aspect, the first and second conduits can be positioned adjacent and substantially parallel one another.

Figure 5:
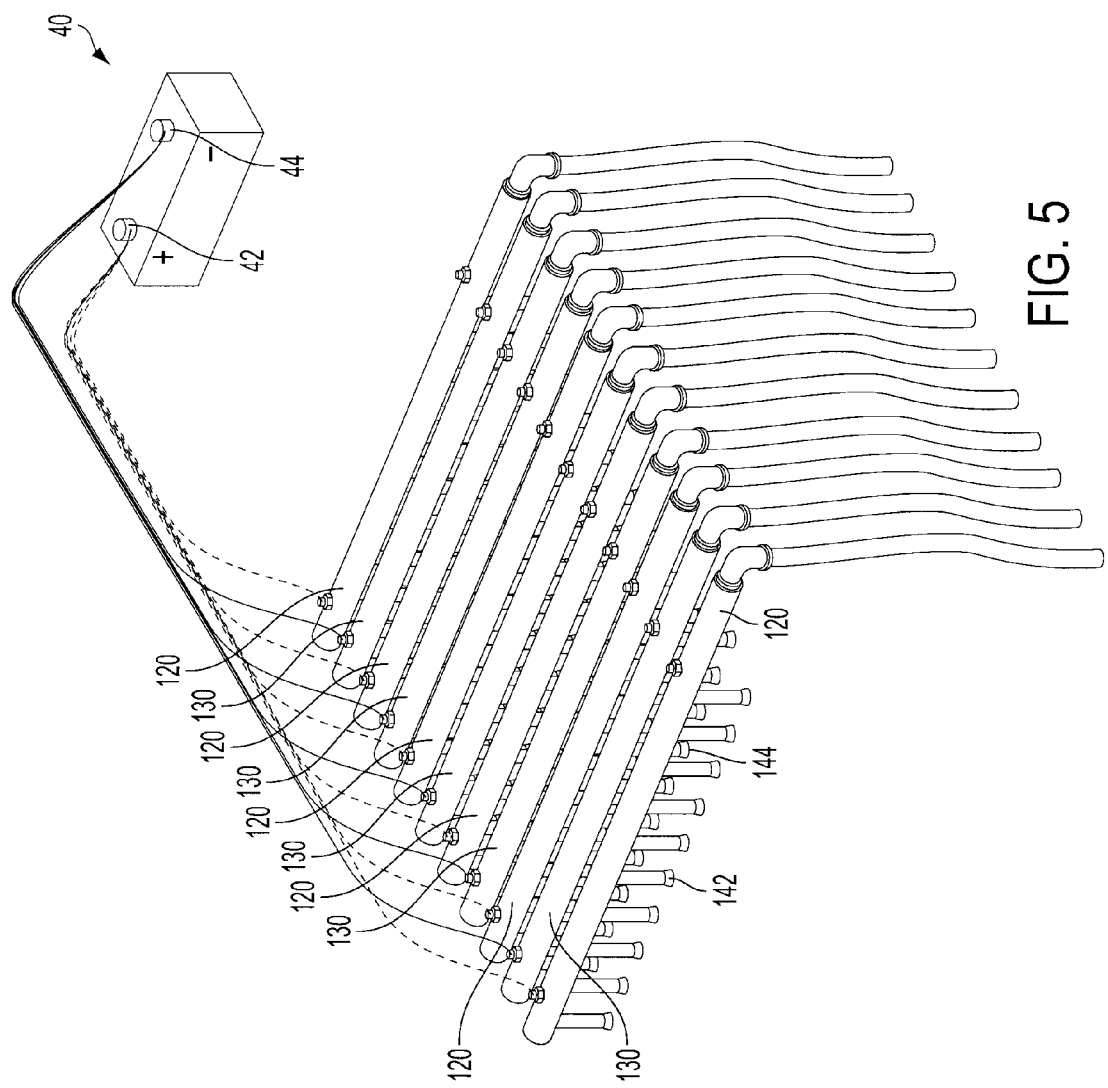
FIG. 5 is a perspective view of a plurality of first and second conduits of one aspect of a poultry stunner, coupled to an electrical power source.
Figure 6:
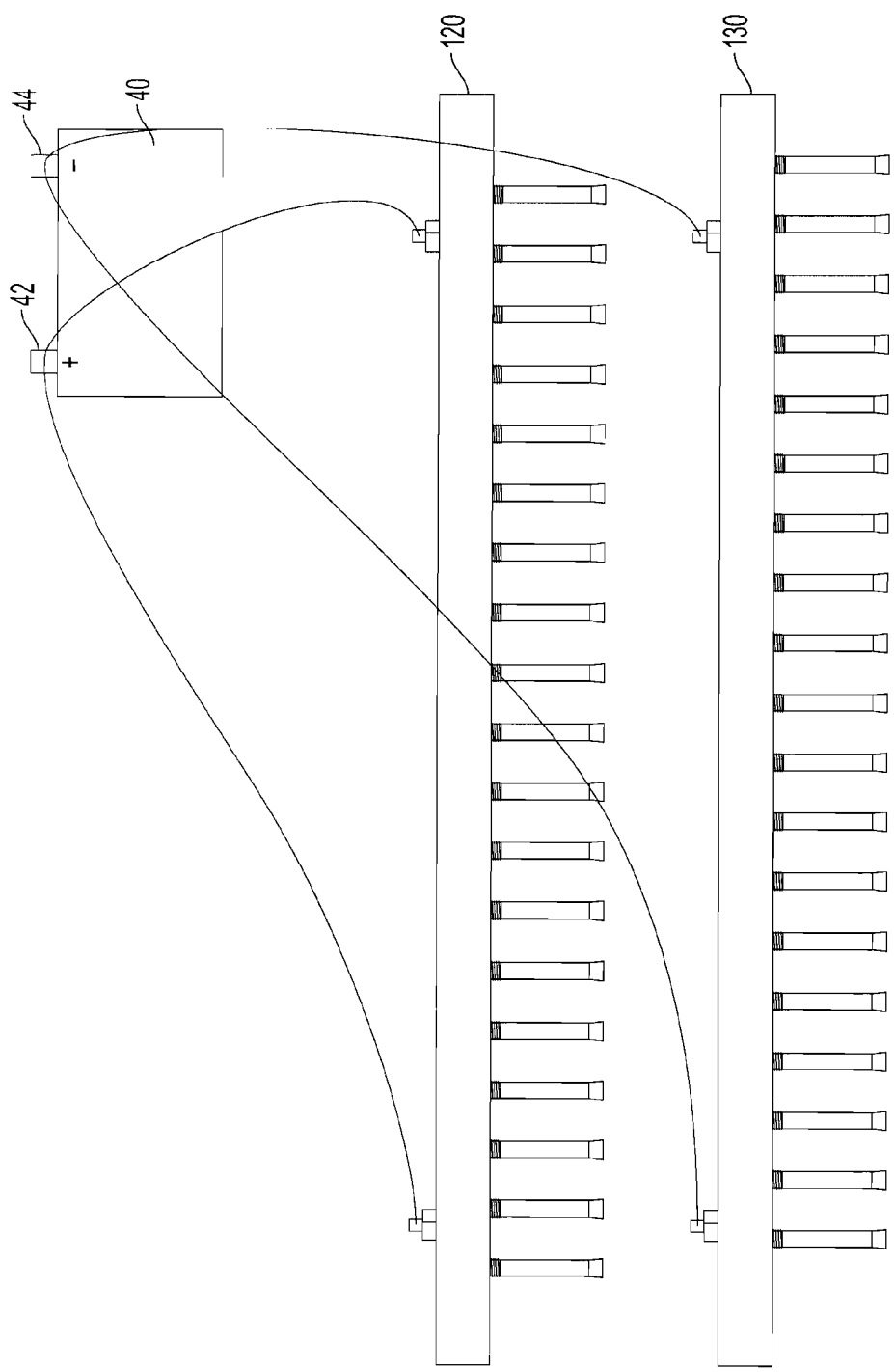
FIG. 6 is a front elevational view of a first and second conduit, each coupled to an electrical power source.

As can be appreciated, the first and second conduits can also each comprise a nozzle 140 for optimum distribution of fluid within the at least partially enclosed passageway. The nozzles 140 can, for instance, attach to a distal end portion of each or of some of the conduits. The nozzles can also be integral with the conduits. As illustrated in FIGS. 4-6, each first and second conduit may comprise a plurality of nozzles. In this aspect, where each first conduit is positioned substantially adjacent a second conduit 130, the first nozzles 142 can be positioned, relative to the machine axis of the conveyor 110, in staggered relationship with the adjacent second nozzles. Optionally, it is contemplated that the first nozzles 142 can be positioned, relative to the machine axis of the conveyor, substantially in an in-line relationship substantially parallel to the machine axis.

The distance between each first nozzle 142 and each second nozzle 144 determines where the electrical circuit is completed. For instance, it is generally easier to stun a bird when the circuit is completed about a portion of the birds head. Therefore, in one exemplary aspect, the first and second nozzles are spaced from one another at about 3 inch centers or less. In a further aspect, the first and second nozzles are spaced from one another at about 2 inch centers or less.

In one aspect, the nozzles 140 comprise a plurality of outlets and are configured to produce a stream of fluid that is substantially laminar. In another aspect, the nozzles can comprise substantially straight pipes defining open distal ends. Due to particulate and other foreign material that may be present in the fluid system, even with filtration present, the nozzles can be sufficiently large in diameter so as not to regularly clog. In one non-limiting example, the nozzles can be about 0.260 inches in diameter. The nozzles can be any length sufficient to induce substantially laminar flow. For example and not meant to be limiting, the nozzles can be about 6" in length.

In one aspect, the system comprises an electrical power source 40 coupled to at least one of the first conduit(s) and/or at least one of the second conduit(s). In one aspect, the electrical power source 40 can supply direct current (DC); however, in another aspect, the electrical power source 40 can supply alternating current (AC). In one aspect, a first terminal 42 of the power source is coupled to at least one of the first conduits. In another aspect, the first terminal 42 is coupled to a plurality of first conduits. In yet another aspect, the first terminal is coupled to all of the first conduits. In this aspect, the fluid passing through the at least one first conduit 120 becomes electrically charged. Therefore, the stream of fluid that is directed into the passageway 100 is also electrically charged. As can be appreciated, the connection between the first conduits and the electrical power source can be made in any conventional fashion and at any point, such as in the conduits themselves, the nozzles, or in the manifold, if present.

In an exemplary aspect, at least one of the second conduits is coupled to a second terminal 44 of the power source. In another aspect, a plurality of second conduits are coupled to the second terminal 44 of the power source. In still another aspect, all of the second conduits are coupled to the second terminal of the power source. In one aspect, the first and second terminals are oppositely charged. In an AC power system, one of the terminals can be a hot terminal, while the other can be a neutral terminal.

In operation, the stream of fluid directed into the passageway from the first conduit(s) comes into contact with at least one bird within the passageway, and the stream of fluid directed into the passageway from the second conduit(s) also comes into contact with the bird within the passageway. Thus, the bird itself completes the electrical circuit and the current flows therethrough the bird and the area within the at least partially enclosed passageway forms a stunning zone.

As can be appreciated, the electric charge and current passing through the birds should be sufficient to stun the birds and render them substantially motionless while not killing them. This facilitates the hand loading of the birds into the shackles for further processing. In one aspect, the power source 40 energizes the conduit(s) to a voltage in a range from about 12 volts to about 40 volts. In another aspect the power source energizes the conduit(s) to a voltage in a range from about 15 volts to about 35 volts.

In one exemplary aspect, at least a portion of the conveyor comprises a non-conductive material. However, it is contemplated that the system can be configured to couple one terminal of the electrical power source to one or more of the conduits, while coupling the other terminal to an electrically conductive conveyor. In this aspect, the electrical circuit described herein above can be completed via the stream, through the bird, and to the electrically conductive conveyor.

In another aspect, the conveyor is configured to move live poultry through the stunner 10 in an unrestrained and/or unshackled manner. However, it is contemplated that the conveyor can also move birds that are restrained in some manner.

In yet another aspect of the poultry processing system, the fluid source in communication with the conduits comprises a saline electrolyte. In another aspect, the electrolyte is a saturated saline solution. It is contemplated that other solutions may be used. For example, any conventional solution that would ionize can be used. In yet another aspect, the system comprises means for collecting, filtering, and recycling the solution.

Varying the temperature of the fluid can also have an effect on the process. For example, it has been found that using a cool fluid can make it more difficult to pick the birds after killing them. Picking is the process of taking the feathers off the birds. Therefore, in one aspect, the fluid is heated to a temperature in a range from about 80 degrees Fahrenheit to about 140 degrees Fahrenheit. In another aspect, the fluid is heated to a temperature in a range from about 100 degrees Fahrenheit to about 125 degrees Fahrenheit.

The system described herein also presents a method of stunning live poultry for processing. In one aspect, the method comprises: directing a first stream of fluid from a fluid source into at least a portion of the at least partially enclosed passageway 100: directing a second stream of fluid from the fluid source into at least a portion of the at least partially enclosed passageway: providing an electrical power source: energizing the first stream of fluid with an electric current: and energizing the second stream with an opposite charge than that of the first fluid stream. In a further aspect, the method can also comprise: providing the poultry stunner; conveying the live poultry through the at least partially enclosed passageway; and providing a fluid source.

Alternatively, the method can also comprise: directing a first stream of fluid from a fluid source into at least a portion of the at least partially enclosed passageway; providing an electrical power source; energizing the first stream of fluid with an electric current; and energizing an electrically conductive conveyor with an opposite charge than that of the first fluid stream such that the first fluid stream and the electrically conductive conveyor complete an electrical circuit through the live poultry within the enclosed passageway, which delivers an electric charge to the live poultry. In an additional aspect, the method can optionally comprise: providing the poultry stunner; conveying the live poultry through the at least partially enclosed passageway; and providing a fluid source.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

I claim:

1. A poultry processing system for stunning live poultry comprising one or more birds, the poultry processing system comprising:
   a poultry stunner;
   an electrical power source having a first terminal and second terminal;
   a fluid source;
   at least one first conduit in fluid communication with the fluid source, configured to direct a first stream of fluid into at least a portion of the stunner; and
   at least one second conduit in fluid communication with the fluid source, configured to direct a second stream of fluid into at least a portion of stunner; wherein the at least one first conduit is in electrical communication with the first terminal of the electrical power source and is configured to electrically charge the first fluid stream, and wherein the at least one second conduit is in electrical communication with the second terminal of the electrical power source.

2. The poultry processing system of claim 1, wherein the poultry stunner defines an at least partially enclosed passageway.

3. The poultry processing system of claim 1, further comprising a conveyor to convey the poultry through the stunner.

4. The poultry processing system of claim 3, wherein the conveyor comprises a non-conductive material.

5. The poultry processing system of claim 1, further comprising means for conveying unrestrained poultry through the stunner.

6. The poultry processing system of claim 1, wherein the first and second conduits are positioned substantially adjacent one another such that the first and second fluid streams contact at least one bird to complete an electric circuit through the at least one bird.

7. The poultry processing system of claim 1, wherein the at least one first conduit comprises a plurality of first conduits, and the at least one second conduit comprises a plurality of second conduits, and wherein at least one of the plurality of first conduits is in electrical communication with the first terminal of the electrical power source and at least one of the plurality of second conduits is in electrical communication with the second terminal of the electrical power source.

8. The poultry processing system of claim 7, wherein the plurality of first conduits is in electrical communication with the first terminal of the electrical power source and the plurality of second conduits is in electrical communication with the second terminal of the electrical power source.

9. The poultry processing system of claim 8, wherein at least a portion of some of the plurality of first conduits and second conduits are interdigitated.

10. The poultry processing system of claim 1, wherein the fluid source comprises a first fluid source and a second fluid source, and wherein the first fluid source is in fluid communication with the at least one first conduit and the second fluid source is in fluid communication with the at least one second conduit.

11. The poultry processing system of claim 1, wherein the electrical power source supplies DC power.

12. The poultry processing system of claim 1, wherein the electrical power source supplies AC power.

13. The poultry process system of claim 12, wherein the electrical power source supplies electrical power with a voltage from about 12 volts to about 40 volts.

14. The poultry processing system of claim 13, wherein the electrical power source supplies electrical power with a voltage from about 15 volts to about 35 volts.

15. The poultry processing system of claim 1, wherein the fluid source comprises an electrolytic solution.

16. The poultry processing system of claim 15, wherein the fluid is heated to a temperature from about 80 degrees Fahrenheit to about 140 degrees Fahrenheit.

17. The poultry processing system of claim 16, wherein the fluid is heated to a temperature from about 100 degrees Fahrenheit to about 125 degrees Fahrenheit.

18. A poultry processing system for stunning live poultry comprising one or more birds, comprising:
    a poultry stunner defining an at least partially enclosed passageway;
    an electrically conductive conveyor to convey the live poultry through the at least partially enclosed passageway;
    an electrical power source, comprising a first terminal and a second terminal;
    a fluid source; and
    at least one conduit in fluid communication with the fluid source, configured to direct a stream of fluid into the at least partially enclosed passageway to form a stunning zone;
    wherein the conduit is in electrical communication with the first terminal and configured to electrically charge the fluid stream directed into the stunning zone, and wherein the electrically conductive conveyor is in electrical communication with the second terminal and is oppositely charged, whereby the stream and the conveyor complete an electric circuit which delivers an electric charge to the live poultry within the at least partially enclosed passageway.

19. The poultry processing system of claim 18, wherein the electric charge is sufficient to stun the poultry.

20. The poultry processing system of claim 18, wherein the plurality of conduits comprises at least one manifold in fluid communication with the fluid source and comprising a plurality of nozzles, and wherein the at least one manifold is electrically charged.

21. The poultry process system of claim 18, wherein the electrical power source supplies electrical power with a voltage from about 12 volts to 40 volts.

22. The poultry processing system of claim 21, wherein the electrical power source supplies electrical power with a voltage from about 15 volts to 35 volts.

23. The poultry processing system of claim 18, wherein the fluid source comprises an electrolytic solution.

24. The method of claim 23, further comprising providing a poultry stunner defining the at least a partially enclosed passageway.

25. The method of claim 23, further comprising conveying the live poultry through the at least partially enclosed passageway.

26. A poultry processing system for stunning live poultry comprising at least one bird, comprising:
    a poultry stunner defining an at least partially enclosed passageway;
    a means for conveying live poultry through the at least partially enclosed passageway;
    a means for delivering a first fluid stream into at least a portion of the at least partially enclosed passageway such that it contacts at least a portion of the at least one bird;
    a means for delivering a second fluid stream into at least a portion of the at least partially enclosed passageway such that it contacts at least a portion of the at least one bird;
    a means for electrically charging the first fluid stream; and
    a means for electrically charging the second fluid stream with an opposing charge than the first fluid stream such that the first and second fluid streams complete an electrical circuit through the at least one bird, which delivers an electric charge to the at least one bird.

27. The poultry processing system of claim 26, wherein the electric charge is sufficient to stun the live poultry.

28. The method of claim 27, wherein the live poultry is conveyed unshackled.

29. A method for stunning live poultry comprising one or more birds for processing, comprising:
    directing a first stream of fluid from a fluid source into at least a portion of an at least partially enclosed passageway;
    directing a second stream of fluid from the fluid source into at least a portion of the at least partially enclosed passageway;
    providing an electrical power source;
    energizing the first stream of fluid with an electric current; and
    energizing the second stream with an opposite charge than that of the first fluid stream such that the first and second fluid streams complete an electrical circuit which delivers an electric charge to the live poultry within the enclosed passageway.

\* \* \* \* \*